(12) United States Patent
Hallford

(10) Patent No.: US 9,846,071 B1
(45) Date of Patent: Dec. 19, 2017

(54) POOL WATER LEVEL AND VACUUM MONITOR

(71) Applicant: Paul Hallford, Crestview, FL (US)

(72) Inventor: Paul Hallford, Crestview, FL (US)

( * ) Notice: Subject to any disclaimer, the term of this patent is extended or adjusted under 35 U.S.C. 154(b) by 209 days.

(21) Appl. No.: 14/861,042

(22) Filed: Sep. 22, 2015

(51) Int. Cl.
| | |
|---|---|
| *G01F 23/36* | (2006.01) |
| *E04H 4/12* | (2006.01) |
| *H01H 11/04* | (2006.01) |
| *H01H 1/12* | (2006.01) |
| *H01H 1/36* | (2006.01) |
| *E04H 4/14* | (2006.01) |

(52) U.S. Cl.
CPC ............ *G01F 23/36* (2013.01); *E04H 4/12* (2013.01); *E04H 4/14* (2013.01); *E04H 4/1209* (2013.01); *H01H 1/12* (2013.01); *H01H 1/36* (2013.01); *H01H 11/042* (2013.01); *H01H 2205/00* (2013.01)

(58) Field of Classification Search
CPC ....... E04H 4/1209; E04H 4/12; H01H 11/042; H01H 1/12; H01H 1/36; H01H 2205/00
See application file for complete search history.

(56) References Cited

U.S. PATENT DOCUMENTS

| | | | |
|---|---|---|---|
| 2,809,752 A | 10/1957 | Donald | |
| 4,342,125 A | 8/1982 | Hodge | |
| 4,380,091 A | 4/1983 | Lively | |
| 4,972,530 A | 11/1990 | Snyder | |
| 4,991,294 A | 2/1991 | Breiner | |
| 5,713,164 A | 2/1998 | Ryan | |
| 5,992,447 A * | 11/1999 | Miller | E04H 4/12 137/386 |
| 6,006,605 A * | 12/1999 | Sulollari | G01F 23/36 73/306 |
| 6,826,787 B2 | 12/2004 | Gregory | |
| D501,182 S | 1/2005 | Buck | |
| 8,209,794 B1 | 7/2012 | Harrison | |
| 2013/0247293 A1* | 9/2013 | Jeronimus | E04H 4/14 4/508 |
| 2015/0204335 A1* | 7/2015 | Allred | E04H 4/1245 417/45 |

FOREIGN PATENT DOCUMENTS

CA 2321771 6/2000

* cited by examiner

*Primary Examiner* — R. A. Smith
*Assistant Examiner* — John M Royston
(74) *Attorney, Agent, or Firm* — Kyle A. Fletcher, Esq.

(57) ABSTRACT

The pool water level and vacuum monitor is a device that is adapted to be seated on a pool deck adjacent to a swimming pool, and which monitors water level when filling a pool liner whilst a vacuum is removing air from behind a pool liner and a concrete wall of a pool. Moreover, the pool water level and vacuum monitor includes a telescoping armature that extends aside of a housing. The telescoping armature includes a cord and a float member on a distal end of the cord. The float member is adapted to rest on a pool surface of the swimming pool, and moves to close a float switch integrated in the float member. The float switch is able to turn off all circuitry associated within the housing.

14 Claims, 6 Drawing Sheets

POOL WATER LEVEL AND VACUUM MONITOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of swimming pools, more specifically, a device adapted to monitor the water level of a swimming pool as well as a vacuum that is used to remove air between a pool liner and a concrete pool wall while the pool liner is being filled.

SUMMARY OF INVENTION

The pool water level and vacuum monitor is a device that is adapted to be seated on a pool deck adjacent to a swimming pool, and which monitors water level when filling a pool liner whilst a vacuum is removing air from behind a pool liner and a concrete wall of a pool. Moreover, the pool water level and vacuum monitor includes a telescoping armature that extends aside of a housing. The telescoping armature includes a cord and a float member on a distal end of the cord. The float member is adapted to rest on a pool surface of the swimming pool, and moves to close a float switch integrated in the float member. The float switch is able to turn off all circuitry associated within the housing. At least one electrical receptacle and at least one electrical switch are in communication with the float switch, as well as at least one water valve. An electrical plug is in wired connection with all electrical components associated within the housing. The electrical plug is connected to a vacuum that removes air between a pool liner and a concrete wall of a pool. The electrical plug is turned off when the swimming pool water level reaches a predetermined height. The at least one water valve is used to control the output of water dispensed directly into the swimming pool. The circuitry included inside of the housing includes a relay and a transformer.

These together with additional objects, features and advantages of the pool water level and vacuum monitor will be readily apparent to those of ordinary skill in the art upon reading the following detailed description of the presently preferred, but nonetheless illustrative, embodiments when taken in conjunction with the accompanying drawings.

In this respect, before explaining the current embodiments of the pool water level and vacuum monitor in detail, it is to be understood that the pool water level and vacuum monitor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pool water level and vacuum monitor.

It is therefore important that the claims be regarded as including such equivalent construction insofar as they do not depart from the spirit and scope of the pool water level and vacuum monitor. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
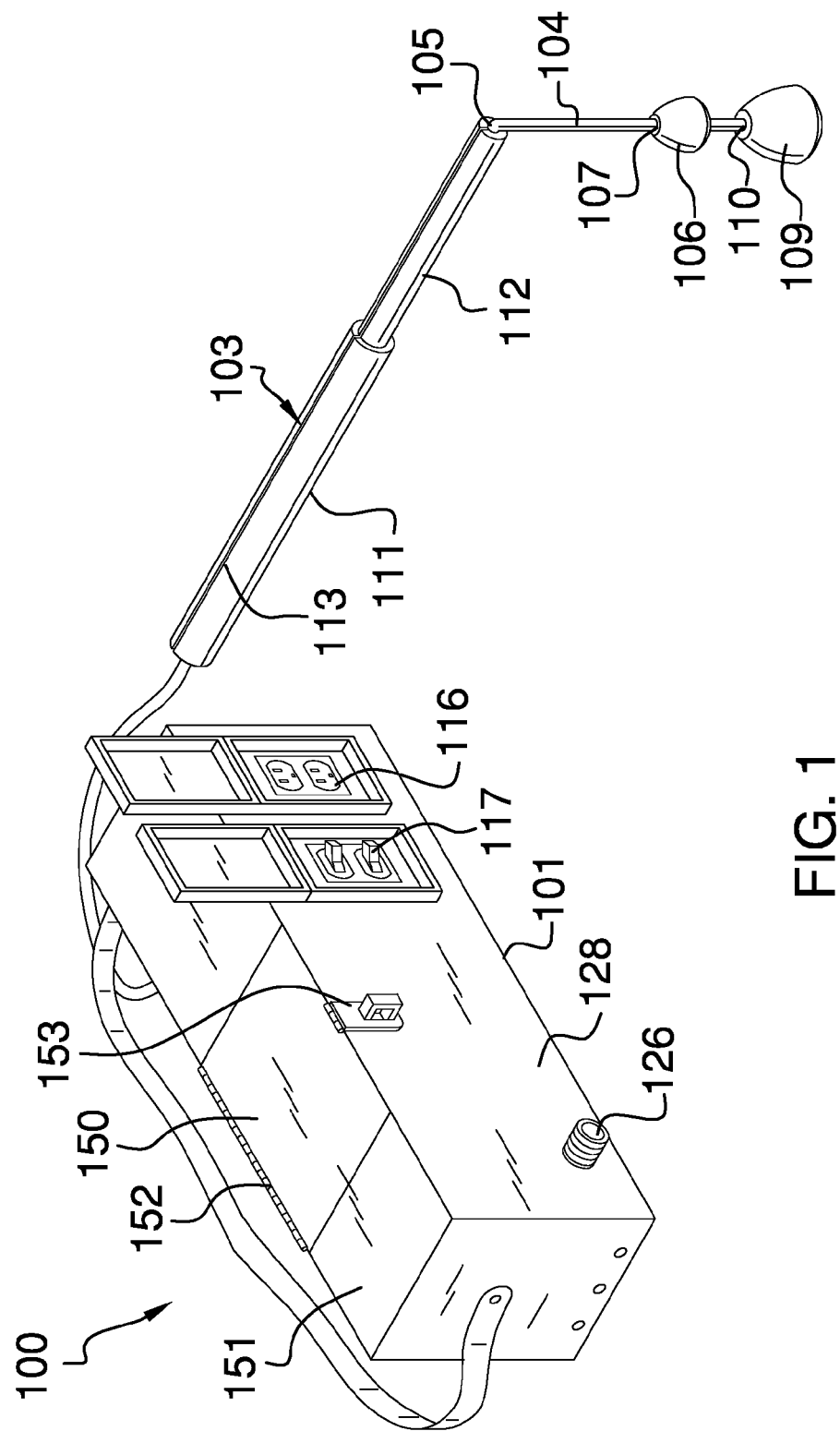
FIG. 1 is a perspective view of an embodiment of the disclosure.
Figure 2:
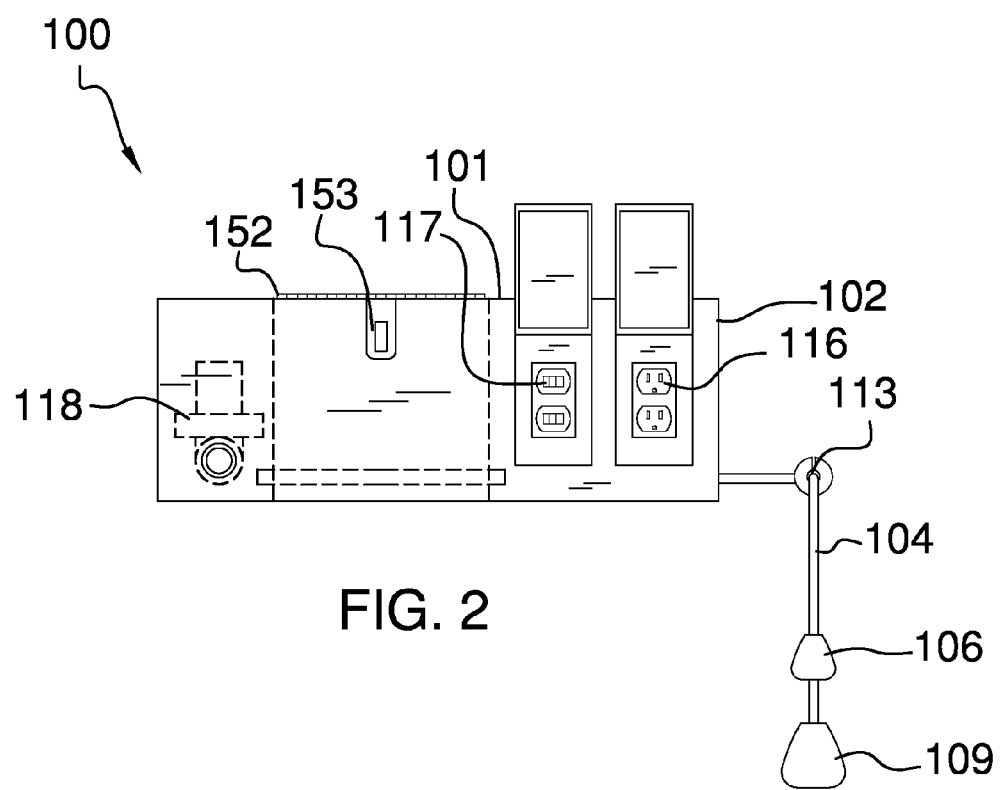
FIG. 2 is a front view of an embodiment of the disclosure.
Figure 3:
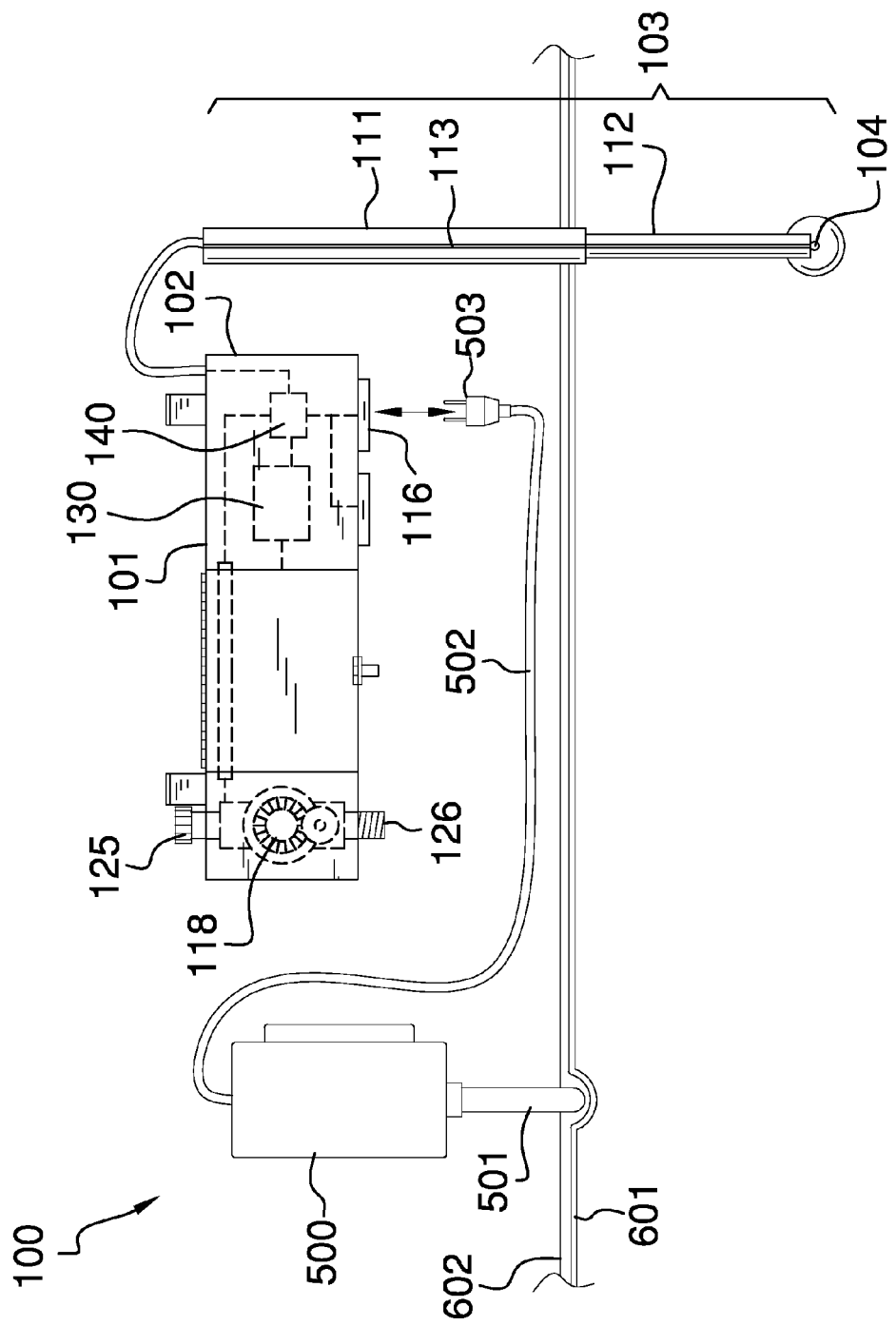
FIG. 3 is a top view of an embodiment of the disclosure.
Figure 4:
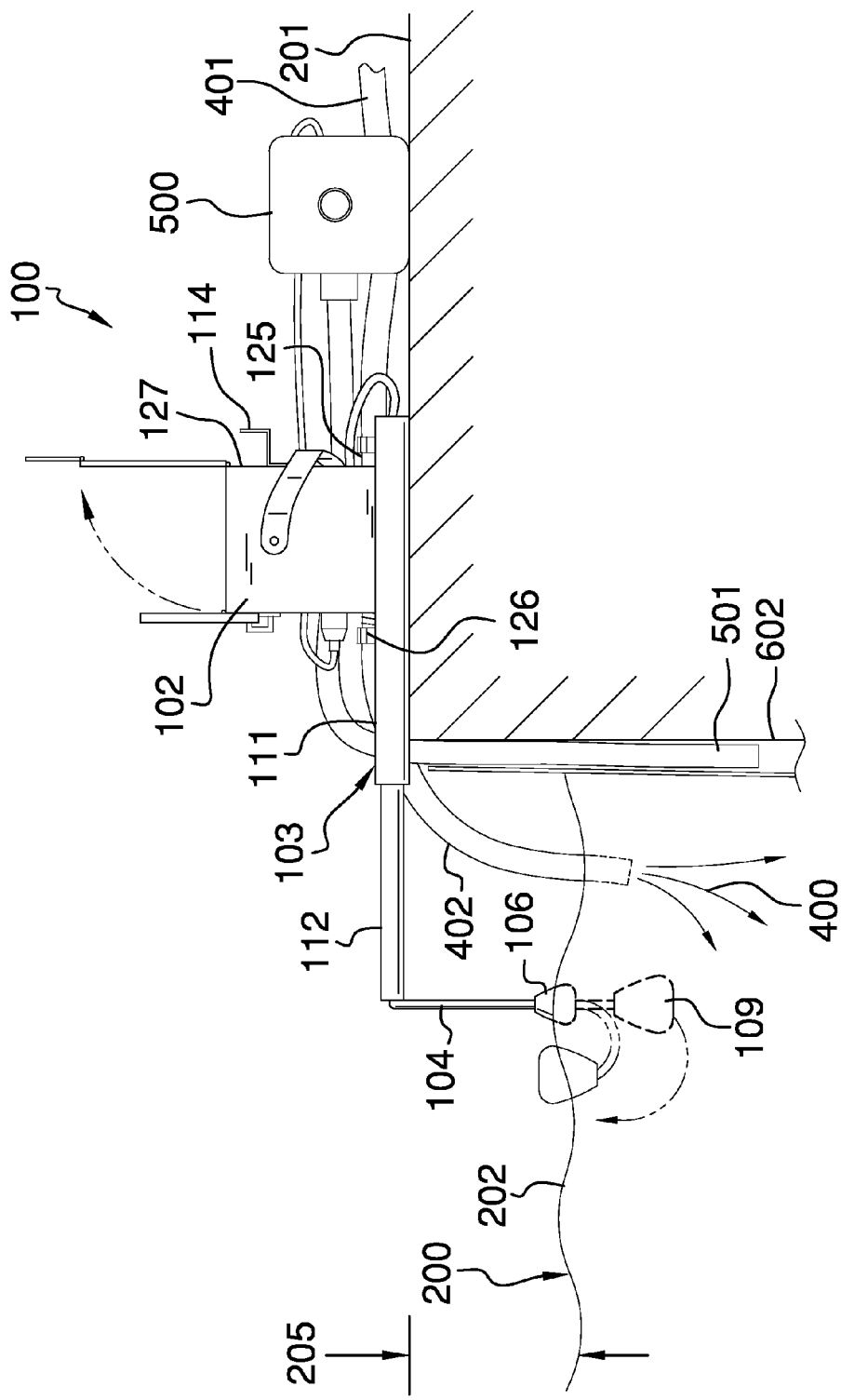
FIG. 4 is an in use view of an embodiment of the disclosure.
Figure 5:
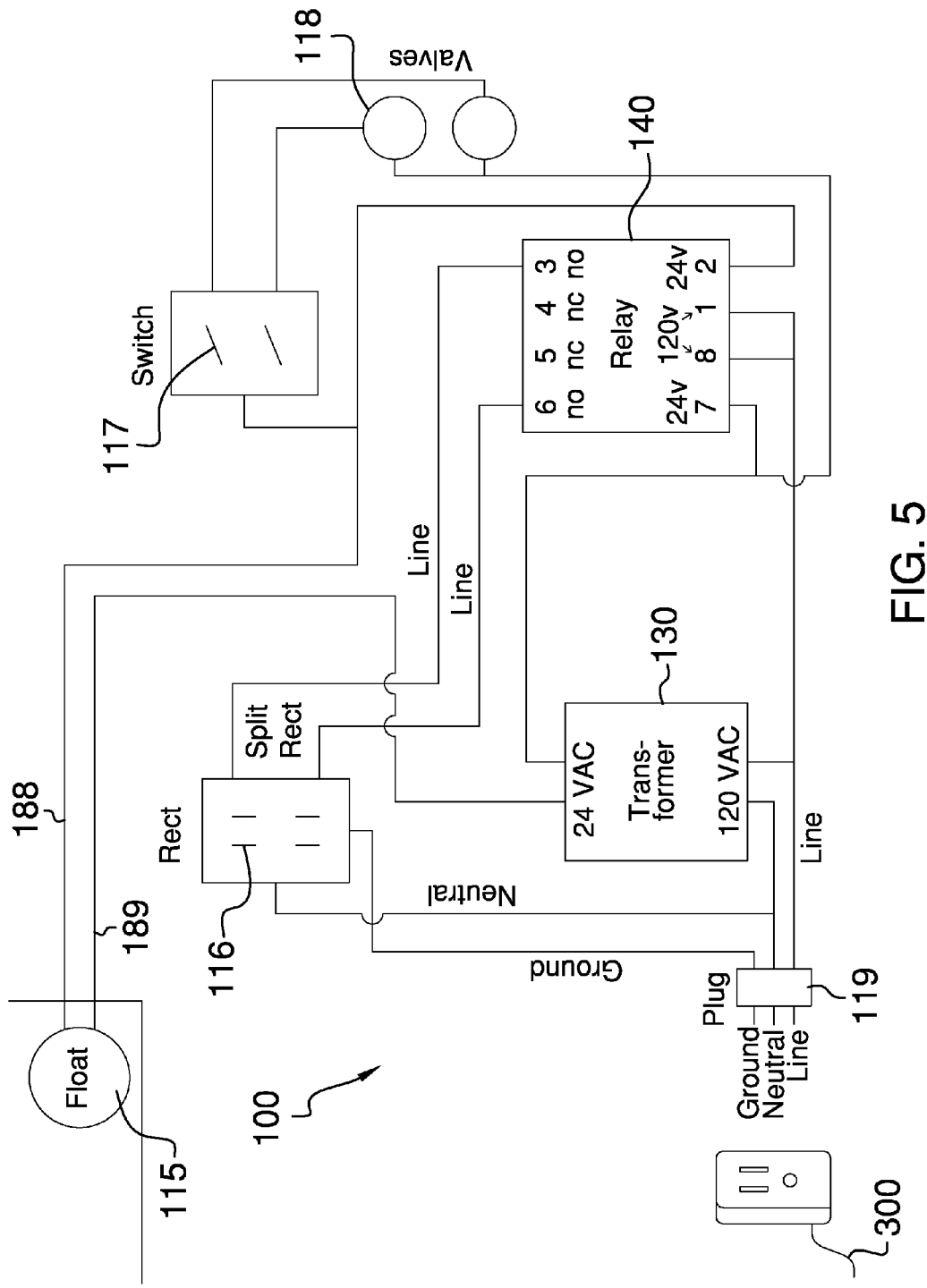
FIG. 5 is an electrical diagram of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to potential embodiments of the disclosure, which are illustrated in FIGS. 1 through 7. The pool water level and vacuum monitor 100 (hereinafter invention) comprises a housing 101 that is adapted to be placed on a pool deck 201 adjacent to a swimming pool 200. The housing 101 is of hollowed construction, and includes componentry associated with the administration of electrical and/or water needs of the swimming pool 200 as well as monitoring of a swimming pool water level 205.

The housing 101 is further defined with a first distal end 102 that includes a telescoping armature 103 that extends there from. The telescoping armature 103 extends away from the housing 101. Moreover, the telescoping armature 103 includes a cord 104 that extends downwardly from a telescoping distal end 105. The cord 104 includes a weight member 106 on a cord distal end 107. The weight member 106 is adapted to be suspended above or in a swimming pool surface 202. The cord 104 extends through the weight member 106, and extends downwardly to connect with a float member 109. The cord 104 attaches to the float member 109 at a third distal end 110. The float member 109 includes a float switch 115 therein.

Figure 6:
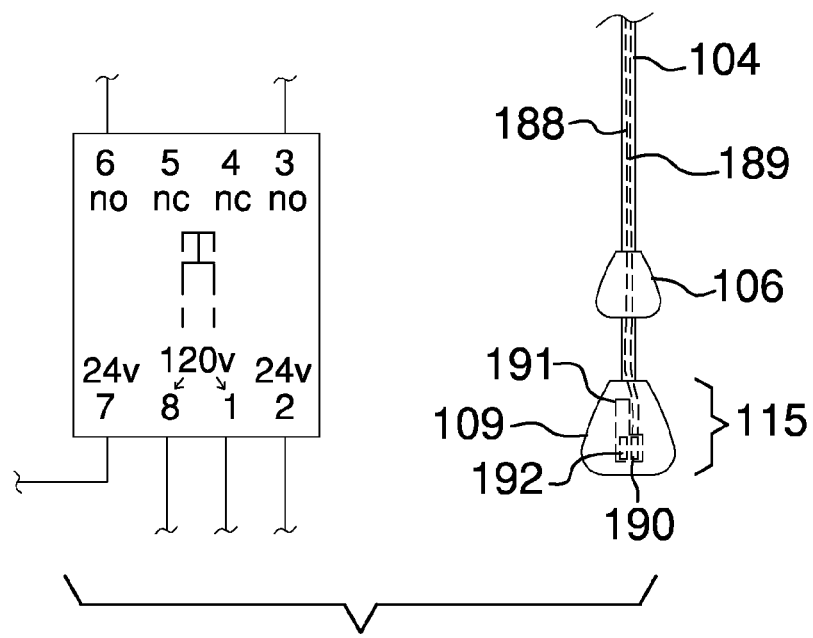
FIG. 6 is a diagram of a relay of an embodiment of the disclosure.
Figure 7:
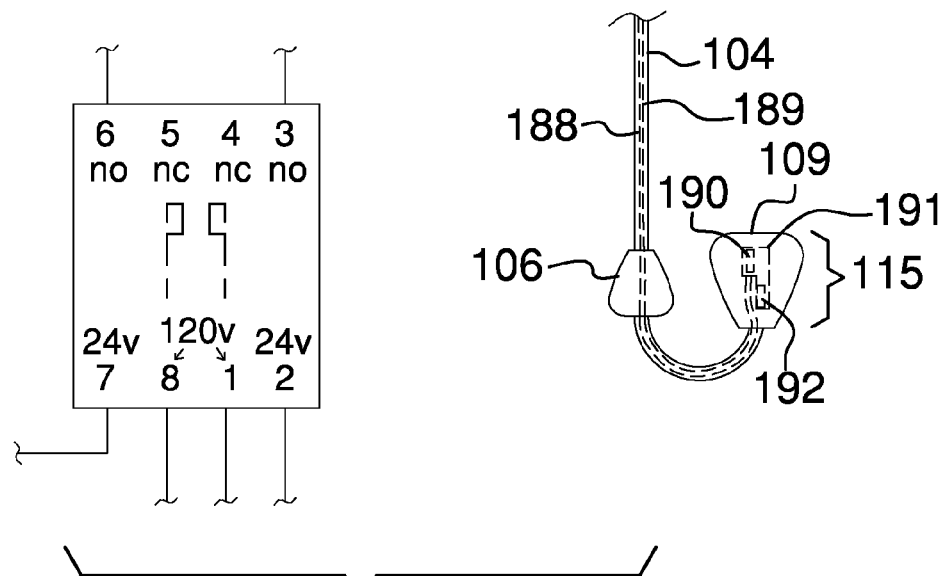
FIG. 7 is a diagram of a relay of an embodiment of the disclosure.

The float switch 115 is used to open or close of a circuit formed via a first wire 188 and a second wire 189. The first wire 188 and the second wire 189 extend along the cord 104. Moreover, the float switch 115 opens or closes a circuit formed via the first wire 188 and the second wire 189. Referring to FIGS. 6 and 7, the float switch 115 includes a first contact 190 that is rigidly affixed within a cavity 191 provided in the float member 109. A second contact 192 is able to move longitudinally within the cavity 191 in order to open or close off the circuit formed via the first wire 188 and the second wire 189.

In use, the weight member 106 provides tension on the cord 104 in order to provide an accurate operation of the float switch 115 in the float member 109. Where both the float member 109 and the weight member 106 are suspended above the swimming pool surface 202, the float switch 115 closes off the circuit formed via the first wire 188 and the second wire 189, and supplies power to the at least one electrical outlet 116 and the at least one water valve 116. Moreover, when the float member 109 is adaptively resting on the swimming pool surface 202, tension is released from the cord 104, and the float switch 115 opens the circuit formed via the first wire 188 and the second wire 189 thereby stopping electrical function to the at least one electrical outlet 116 and the at least one water valve 118.

The telescoping armature 103 is further defined with a first armature 111 and a second armature 112. The second armature 112 extends and retracts with respect to the first armature 111. Both the first armature 111 and the second armature 112 include a groove 113 thereon. The groove 113 extends along both the first armature 111 and the second armature 112. The cord 104 extends from the housing 101, along the groove 113 of the first armature 111 and the second armature 112, and down to the weight member 106 and to the float member 109.

The telescoping armature 103 is supported against the first distal end 102 of the housing 101 via an armature bracket 114. The cord 104 extends into the housing 101, and the first wire 188 and the second wire 189 connect to a relay 140. The float switch 115 controls electrical function of the invention 100, and is used to turn off electricity where the swimming pool water level 205 goes above or below a predetermined value.

The housing 101 includes the at least one electrical outlet 116, at least one electrical switch 117, and at least one water valve 118. The at least one electrical outlet 116, the at least one electrical switch 117, and the at least one water valve 118 are all in wired connection with an electrical plug 119. The electrical plug 119 is adapted to be connected to an electrical power source 300. Moreover, the electricity provided via the electrical plug 119 is controlled via the float switch 115.

The at least one water valve 118 controls water flow 400 from a water hose 401, and into the swimming pool 402 via a second water hose 403. The at least one water valve 118 is further defined with an inlet 125 and an outlet 126. The inlet 125 is located on a rear surface 127 of the housing 101; whereas the outlet 126 is located on a front surface 128 of the housing 101. It shall be noted that the front surface 128 of the housing 101 faces the swimming pool 200. It shall also be noted that the at least one electrical outlet 116 and the at least one electrical switch 117 are provided on the front surface 128 of the housing 101.

The inlet 125 of the at least one water valve 118 is adapted to connect with the water hose 401; whereas the outlet 126 of the at least one water valve 118 is connected to the second water hose 403. The second water hose 402 extends into the swimming pool 200. The electrical plug 119 is wired to a transformer 130 that in turn is wired to the at least one electrical switch 117 as well as the at least one water valve 118. The invention 100 includes the relay 140 that is wired to the electrical plug 119, the float switch 115, the at least one water valve 118, the at least one electrical outlet 116, and the at least one electrical switch 117.

The housing 101 may include a door 150 that is used to provide access into the housing 101. The door 150 is attached to a top surface 151 of the housing 101. Moreover, the door 150 is rotatably engaged with respect to the top surface 151 of the housing 101 via a hinge 152. The door 150 may include a latch 153 to secure the door 150 onto the housing 101. The at least one electrical switch 117 is used to control the at least one water valve 118.

The at least one electrical outlet 116 is used to provide electricity to a vacuum 500, which plugs therein. The vacuum 500 is used to remove air from between a pool liner 601 and a pool wall 602. The vacuum 500 includes a vacuum hose 501 that is adapted to be inserted between the pool liner 601 and the pool wall 602 in order to remove air that may otherwise be trapped therein, and while the swimming pool 402 is being filled with water. The vacuum 500 includes a power cord 502 and a plug 503. The plug 503 is plugged into the at least one electrical outlet 116.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A pool water level and vacuum monitor comprising:
a housing that is adapted to be placed on a pool deck adjacent to a swimming pool;
wherein a float switch controls electricity provided to the housing;
wherein at least one water valve is used to provide controlled dispersement of water from a water hose into said swimming pool;
wherein at least one electrical outlet is provided, and is adapted to be connected to a vacuum that is used to adaptively remove air between a pool liner and a pool wall while the swimming pool is being filled with water;
wherein the housing is of hollowed construction, and includes componentry associated with the administration of electrical and/or water needs of the swimming pool as well as monitoring of a swimming pool water level;

wherein the housing is further defined with a first distal end that includes a telescoping armature that extends there from;

wherein the telescoping armature extends away from the housing;

wherein the telescoping armature includes a cord that extends downwardly from a telescoping distal end;

wherein the cord includes a weight member on a cord distal end;

wherein the weight member is adapted to be suspended above or in a swimming pool surface;

wherein the cord extends through the weight member, and extends downwardly to connect with a float member;

wherein the cord attaches to the float member at a third distal end;

wherein the float member includes the float switch therein;

wherein the float switch is used to open or close of a circuit formed via a first wire and a second wire;

wherein the first wire and the second wire extend along the cord;

wherein the float switch opens or closes a circuit formed via the first wire and the second wire;

wherein the float switch includes a first contact that is rigidly affixed within a cavity provided in the float member;

wherein a second contact is able to move longitudinally within the cavity in order to open or close off the circuit formed via the first wire and the second wire.

2. The pool water level and vacuum monitor according to claim 1 wherein the weight member provides tension on the cord in order to provide an accurate operation of the float switch in the float member; wherein once both the float member and the weight member are suspended above the swimming pool surface, the float switch closes off the circuit formed via the first wire and the second wire to power the at least one electrical outlet and the at least one water valve; wherein once the float member is adapted to rest on the swimming pool surface, tension is released from the cord, and the float switch opens the circuit formed via the first wire and the second wire thereby stopping electrical function to the at least one electrical outlet and the at least one water valve.

3. The pool water level and vacuum monitor according to claim 2 wherein the telescoping armature is further defined with a first armature and a second armature; wherein the second armature extends and retracts with respect to the first armature; wherein both the first armature and the second armature include a groove thereon; wherein the groove extends along both the first armature and the second armature; wherein the cord extends from the housing, along the groove of the first armature and the second armature, and down to the weight member and to the float member.

4. The pool water level and vacuum monitor according to claim 2 wherein the telescoping armature is supported against the first distal end of the housing via an armature bracket; wherein the cord extends into the housing, and the first wire and the second wire connect to a relay.

5. The pool water level and vacuum monitor according to claim 4 wherein the housing includes the at least one electrical outlet, at least one electrical switch, and at least one water valve; wherein the at least one electrical outlet, the at least one electrical switch, and the at least one water valve are all in wired connection with an electrical plug; wherein the electrical plug is adapted to be connected to an electrical power source; wherein the electricity provided via the electrical plug is controlled via the float switch and to the relay.

6. The pool water level and vacuum monitor according to claim 5 wherein the at least one water valve controls water flow from a water hose, and into the swimming pool via a second water hose; wherein the at least one water valve is further defined with an inlet and an outlet.

7. The pool water level and vacuum monitor according to claim 6 wherein the inlet is located on a rear surface of the housing; wherein the outlet is located on a front surface of the housing.

8. The pool water level and vacuum monitor according to claim 7 wherein the front surface of the housing is adapted to face the swimming pool; wherein the at least one electrical outlet and the at least one electrical switch are provided on the front surface of the housing.

9. The pool water level and vacuum monitor according to claim 7 wherein the inlet of the at least one water valve is adapted to connect with the water hose; whereas the outlet of the at least one water valve is connected to the second water hose; wherein the second water hose extends into the swimming pool.

10. The pool water level and vacuum monitor according to claim 9 wherein the electrical plug is wired to a transformer that in turn is wired to the at least one electrical switch as well as the at least one water valve; wherein the relay is wired to the electrical plug, the float switch, the at least one water valve, the at least one electrical outlet, and the at least one electrical switch.

11. The pool water level and vacuum monitor according to claim 10 wherein the housing includes a door that is used to provide access into the housing; wherein the door is attached to a top surface of the housing; wherein the door is rotatably engaged with respect to the top surface of the housing via a hinge.

12. The pool water level and vacuum monitor according to claim 11 wherein the door includes a latch to secure the door onto the housing.

13. The pool water level and vacuum monitor according to claim 12 wherein the at least one electrical switch is used to control the at least one water valve.

14. The pool water level and vacuum monitor according to claim 13 wherein the at least one electrical outlet is used to provide electricity to said vacuum; wherein the vacuum is used to remove air from between a pool liner and a pool wall; wherein the vacuum includes a vacuum hose that is adapted to be inserted between the pool liner and the pool wall in order to remove air that may otherwise be trapped therein, and while the swimming pool is being filled with water; wherein the vacuum includes a power cord and a plug; wherein the plug is plugged into the at least one electrical outlet.

* * * * *